United States Patent [19]

Shimizu et al.

[11] 4,208,872
[45] Jun. 24, 1980

[54] BRAKE BOOSTER FOR WHEELED VEHICLES

[75] Inventors: Hidetoshi Shimizu; Mitsuyuki Horie, both of Susono, Japan

[73] Assignee: Toyota Jidosha Kogyo Kabushiki Kaisha, Toyota, Japan

[21] Appl. No.: 892,156

[22] Filed: Mar. 31, 1978

[30] Foreign Application Priority Data

Jun. 25, 1977 [JP] Japan .................. 52-75889

[51] Int. Cl.² .............. F01N 5/04; B60T 13/00
[52] U.S. Cl. .................................. 60/280; 60/281;
60/547 R; 60/559; 91/32
[58] Field of Search .............. 60/547 R, 548, 555,
60/556, 557, 558, 559, 560, 582, 593, 307, 397,
280, 281; 91/6, 32, 460

[56] References Cited

U.S. PATENT DOCUMENTS

| | | | |
|---|---|---|---|
| 2,705,402 | 4/1955 | Stelzer | 60/557 |
| 2,721,629 | 10/1955 | Saussard | |
| 3,369,364 | 2/1968 | Ayers, Jr. | 60/307 |
| 3,500,635 | 3/1970 | Roper | 60/281 |
| 3,545,205 | 12/1970 | Fujita | 60/558 |
| 3,789,735 | 2/1974 | Tam | 60/307 |
| 3,818,702 | 6/1974 | Woo | 91/6 |
| 3,831,489 | 8/1974 | Woo | |
| 4,010,983 | 3/1977 | Coupland | 303/40 |
| 4,017,125 | 4/1977 | Durling | 303/7 |
| 4,018,485 | 4/1977 | Fannin | 303/13 |
| 4,116,218 | 9/1978 | Acre | 91/32 |

FOREIGN PATENT DOCUMENTS 1938087 2/1970 Fed. Rep. of Germany .
192735 11/1937 Switzerland .

Primary Examiner—Abraham Hershkovitz
Attorney, Agent, or Firm—Finnegan, Henderson, Farabow, Garrett & Dunner

[57] ABSTRACT

A pneumatically operated brake booster comprises a hydraulic cylinder disposed within a hydraulic braking circuit connecting a master cylinder to wheel brake cylinders to increase the braking pressure trapped within the wheel brake cylinders and a servomotor for pneumatically activating the hydraulic cylinder in response to hydraulic pressure from the master cylinder. The servomotor has a spring loaded diaphgragm piston forming a negative pressure chamber and a variable pressure chamber, the former being in connection to a source of negative pressure and the latter being connected to the atmospheric pressure in response to master cylinder pressure applied to the hydraulic cylinder. The brake booster includes a control valve which is provided to selectively connect the variable pressure chamber of the servomotor to such a positive pressure source as exhaust pressure to obtain additional pressure in an emergent braking operation of the vehicle.

2 Claims, 4 Drawing Figures

BRAKE BOOSTER FOR WHEELED VEHICLES

BACKGROUND OF THE INVENTION

The present invention relates to a power brake device for wheeled vehicles, and more particularly to a pneumatically operated brake booster of the type which comprises a hydraulic cylinder disposed within a hydraulic braking circuit connecting a master cylinder to wheel brake cylinders for increasing the braking pressure trapped within the wheel brake cylinders and a servomotor for pneumatically activating the hydraulic cylinder in response to hydraulic pressure from the master cylinder.

In a conventional brake booster of this kind, the interior of the servomotor is subdivided by a spring loaded diaphragm piston into a negative pressure chamber and a variable pressure chamber, the former being in connection to a source of negative pressure and the latter connected to the atmospheric pressure in response to master cylinder pressure applied to the hydraulic cylinder from the master cylinder. The diaphragm piston is operatively connected to an operating piston reciprocable within the cylinder to increase the braking pressure trapped within the wheel brake cylinders. In operation of the brake booster, the diaphragm piston of the servomotor is operated by a difference between the negative and atmospheric pressures to activate the hydraulic cylinder. Thus, the increasing ratio of the braking pressure is inevitably influenced by the operation of the diaphragm piston. This means that under a heavy loaded condition of the vehicle, the braking pressure becomes insufficient and that any failure of the vacuum pump in supplying negative pressure to the negative pressure chamber will cause disastrous consequences due to reduction of the braking pressure at the wheel brake cylinders.

SUMMARY OF THE INVENTION

The primary object of the present invention is to provide an improved brake booster wherein additional pressure from a source of positive pressure is applied to the variable pressure chamber of the servomotor in an emergent braking operation of the vehicle to ensure the activation of the hydraulic cylinder.

Another object of the present invention is to provide an improved brake booster wherein even if the negative pressure is not obtainable due to damage of the vacuum pump, the diaphragm piston of the servomotor is operated by a difference between the positive and atmospheric pressure to assure sufficient braking pressure at the wheel brake cylinders.

A further object of the present invention is to provide an improved brake booster wherein a control valve is provided to selectively connect the variable pressure chamber of the servomotor to an exhaust pipe of the prime engine of the vehicle to thereby obtain the additional positive pressure.

According to the present invention, there is disclosed a pneumatically operated brake booster for a vehicle having a hydraulic braking circuit connecting a master cylinder to wheel brake cylinders, a source of negative pressure, and a source of positive pressure, which comprises a housing provided at one side thereof with a cylinder body including a first bore for interposition within the hydraulic circuit and a second bore in communication with the first bore, an operating piston reciprocable within the first bore for subdividing the interior of the first bore into first and second fluid chambers respectively in connection to the master cylinder and the wheel brake cylinders, the operating piston including a check valve means for permitting the flow of fluid supplied from the first fluid chamber to the second fluid chamber when the operating piston is in a retracted position and blocking the flow of fluid from the second fluid chamber to the first fluid chamber when the operating piston is fowarded from the retracted position, and a spring loaded diaphragm piston reciprocable within the housing and subdividing the interior of the housing into a negative pressure chamber and a variable pressure chamber, the former being in connection to the source of negative pressure and the latter being selectively connected to the negative pressure chamber, the source of positive pressure and atmospheric pressure, and the diaphragm piston having a push rod extending into the first bore for forwarding the operating piston from the retracted position to increase the hydraulic pressure trapped within the first fluid chamber upon closing of the check valve means. The brake booster further comprises a control piston movable within the second bore of the cylinder body and arranged to be moved by master cylinder pressure supplied into the second bore from the first fluid chamber of the first bore, first control valve means cooperating with the control piston to connect the variable pressure chamber to the negative pressure chamber under inoperative condition of the control piston and to connect the variable pressure chamber with the atmospheric pressure in response to movement of the control piston, and second control valve means cooperating with the first control valve means to connect the variable pressure chamber with the source of positive pressure in accordance with operation of the first control valve means.

BRIEF DESCRIPTION OF THE DRAWINGS

The above and other objects, features and attendant advantages of the present invention will be more fully appreciated as the same becomes better understood from the following detailed description of a preferred embodiment when considered in connection with the accompanying drawings, in which.

DESCRIPTION OF THE PREFERRED EMBODIMENT

Figure 1:
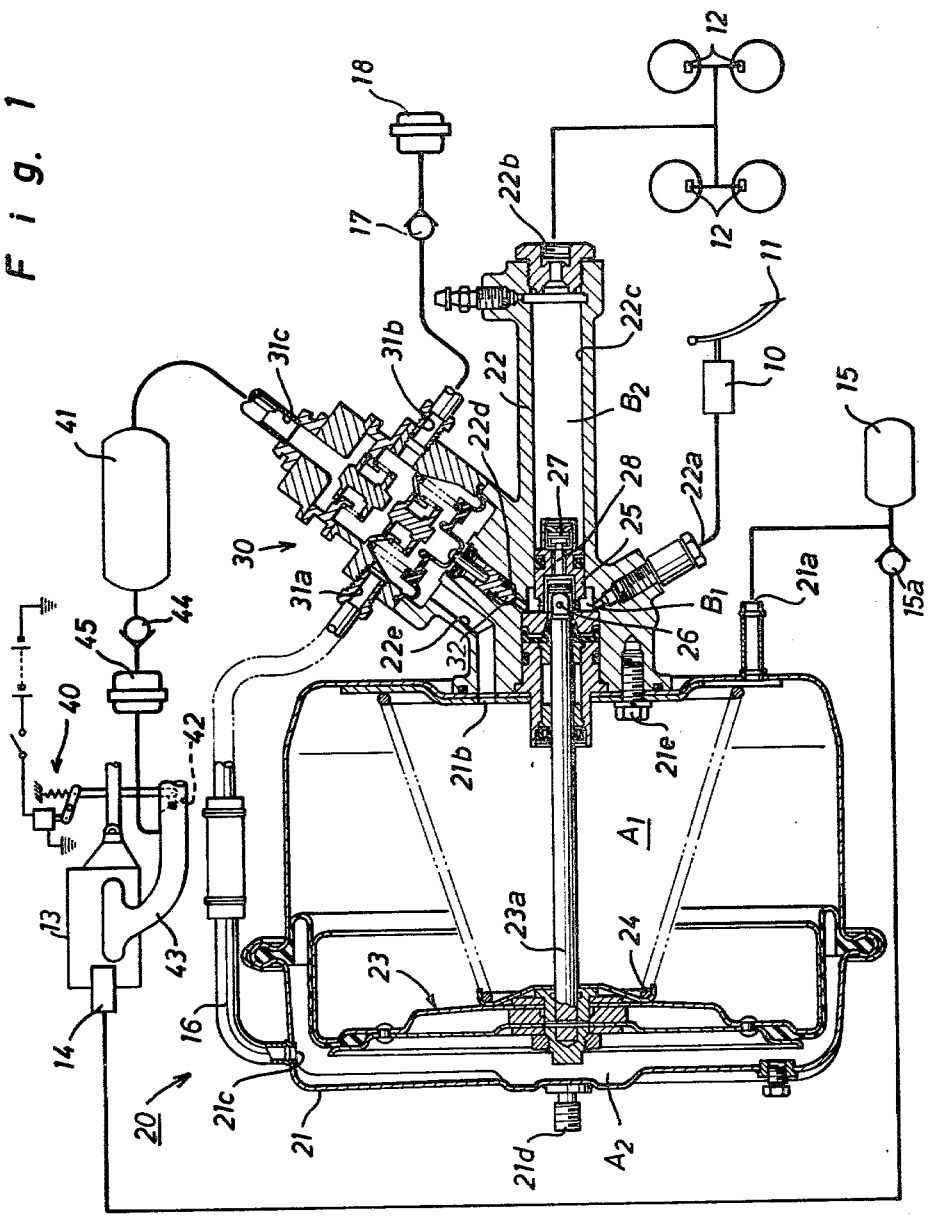
FIG. 1 depicts a hydraulic braking system including a pneumatically operated brake booster in accordance with the present invention.

Referring now to the drawings, particularly with reference to FIG. 1, a pneumatically operated brake booster 20 of the present invention is disposed within a hydraulic circuit connecting a master cylinder 10 to wheel brake cylinders 12. The master cylinder 10 is operatively connected to a foot brake pedal 11 to actuate the brake booster 20.

The brake booster 20 comprises a housing 21 which is securely mounted at the left side thereof on a vehicle body structure by means of a stud bolt 21d and is provided at the right side thereof with a cylinder body 22. A diaphragm piston assembly 23 within the housing 21 is arranged to form a negative pressure chamber $A_1$ in open communication with first and second ports 21a and 21b and a variable pressure chamber $A_2$ in open communication with a third port 21c. The diaphragm piston assembly 23 has a push rod 23a extending into the cylindrical body 22 through seal members and sleeve bearings and is biased leftward by a compression spring 24 to retract the push rod 23a toward an original retracted position. The port 21a is connected to a vacuum tank 15 which is connected through a check valve 15a to a vacuum pump 14 driven by an internal combustion engine 13 for the vehicle.

The cylinder body 22 is air-tightly secured to the housing 21 through an annular seal member by means of bolts 21e and is provided thereon with an inlet port 22a connected to the master cylinder 10 and an outlet port 22b connected to the wheel brake cylinders 12. The cylinder body 22 is also provided therein with a stepped bore 22c in which an operating piston 25 is slidably disposed through an annular seal member to form a first fluid chamber $B_1$ in communication with the inlet port 22a and a second fluid chamber $B_2$ in communication with the outlet port 22b. The piston 25 is connected with the top end of the push rod 23a by a lateral pin 26 and is provided therein with a check valve assembly 27. Under inoperative condition of the brake booster 20, the check valve assembly 27 is opened by a spool 28 to permit fluid communication between the first and second fluid chambers $B_1$ and $B_2$.

Figure 2:
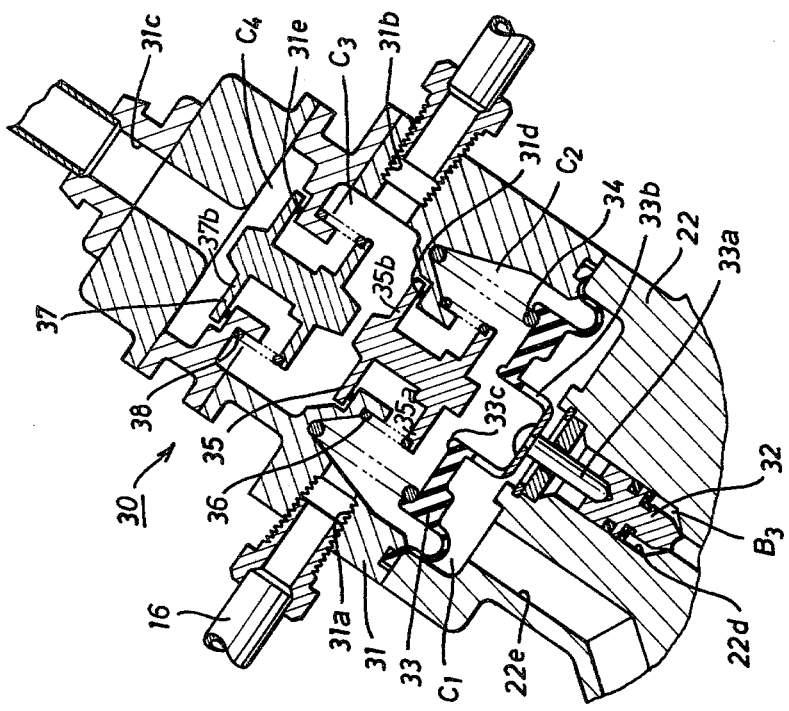
FIGS. 2 to 4 illustrate a mode of operation of a pneumatic pressure controller for the brake booster.

As shown in FIGS. 1 and 2, the brake booster 20 is characterized by provision of a pneumatic pressure controller 30 adapted to the cylinder body 22. The pneumatic pressure controller 30 comprises a control piston 32 which is slidably disposed within a bore 22d of the cylinder body 22 through an annular seal member to form a third fluid chamber $B_3$ in communication with the first fluid chamber $B_1$. The pneumatic pressure controller 30 further comprises a diaphragm piston assembly 33 and two valve bodies 35 and 37 which are coaxially aligned within a casing 31. The casing 31 is secured to a portion of the cylinder body 22 and provided thereon with fourth, fifth and sixth ports 31a, 31b and 31c. The fourth port 31a is, as shown in FIG. 1, connected to the third port 21c of the housing 21 through a pipe 16, the fifth port 31b is connected with an air cleaner 18 through a check valve 17, and the sixth port 31c is connected to an accumulator 41. The accumulator 41 is connected through a check valve 44 and an air cleaner 45 to an exhaust pipe 43 of the engine at the upstream of a cut-off valve 42 for an exhaust braking device 40.

The diaphragm piston assembly 33 is clamped by the joint ends of the casing 31 and the cylinder body 22 to form a first pneumatic chamber $C_1$ and is biased toward the control piston 32 by a compression spring 34. The first pneumatic chamber $C_1$ is in communication with the negative pressure chamber $A_1$ through a passage 22e of the cylinder body 22 and the second port 21b of the housing 21. The diaphragm piston assembly 33 is provided at one side thereof with a rod 33a engaged with the control piston 32 and at the other side thereof with an annular valve seat 33c for engagement with a lower disc 35a of the first valve body 35. The diaphragm piston assembly 33 is also provided thereon with a plurality of radial holes 33b opening into the first pneumatic chamber $C_1$.

The first valve body 35 is located between the fourth and fifth ports 31a and 31b within the casing 31 and is biased toward the diaphragm piston assembly 33 by a compression spring 36 so that an upper disc 35b of the valve body 35 is engaged with an annular valve seat 31d provided on an inner shoulder of the casing 31. Thus, the interior of the casing 31 is subdivided into a second pneumatic chamber $C_2$ in open communication with the fourth port 31a and a third pneumatic chamber $C_3$ in open communication with the fifth port 31b. When the first valve body 35 is moved by engagement with the diaphragm piston assembly 33 against biasing force of the spring 36, the upper disc 35b will separate from the valve seat 31d to permit air communication between the second and third chambers $C_2$ and $C_3$.

The second valve body 37 is located between the fifth and sixth ports 31b and 31c and is biased toward the first valve body 35 by a compression spring 38 so that an upper disc 37b is engaged with an annular valve seat 31e to form a fourth pneumatic chamber $C_4$ opening to the sixth port 31c. When the second valve body 37 is moved by engagement with the first valve body 35 against biasing force of the compression spring 38, the upper disc 37b will separate from the valve seat 31e to permit air communication between the third and fourth chambers $C_3$ and $C_4$.

In operation, the vacuum pump 14 is driven by the vehicle engine 13 to charge the vacuum tank 15 with negative pressure through the check valve 15a, and during travel of the vehicle, the accumulator 41 is charged with compressed gas which is supplied from the exhaust pipe 43 through the air cleaner 45 and the check valve 44 when the cut-off valve 42 is closed.

Under inoperative condition of the brake booster 20, the diaphragm piston assembly 33 of the pneumatic pressure controller 30 is maintained in the initial position by biasing force of the spring 34 so that the first chamber $C_1$ is communicated with the second chamber $C_2$ through the holes 33b, as shown in FIG. 2, and the first and second valve bodies 35 and 37 are maintained in their initial positions by respective biasing forces of the springs 36 and 38 so that the third chamber $C_3$ is isolated from the second and fourth chambers $C_2$ and $C_4$. Thus, the accumulated negative pressure in the vacuum tank 15 is applied into the negative pressure chamber $A_1$ by way of the first port 21a and is also applied into the variable pressure chamber $A_2$ by way of the second port 21b, the passage 22e, the first and second chambers $C_1$ and $C_2$ and the connecting pipe 16. Consequently, the power piston assembly 23 is exposed at opposite faces thereof to the same negative pressure and is positioned in the leftward stroke end thereof due to biasing force of the spring 24. Under this condition, the check valve assembly 27 in the cylinder body 22 is opened by means of the spool 28 to permit fluid communication between the first and second fluid chambers $B_1$ and $B_2$, thereby to release braking pressure in the wheel brake cylinders 12.

Figure 3:
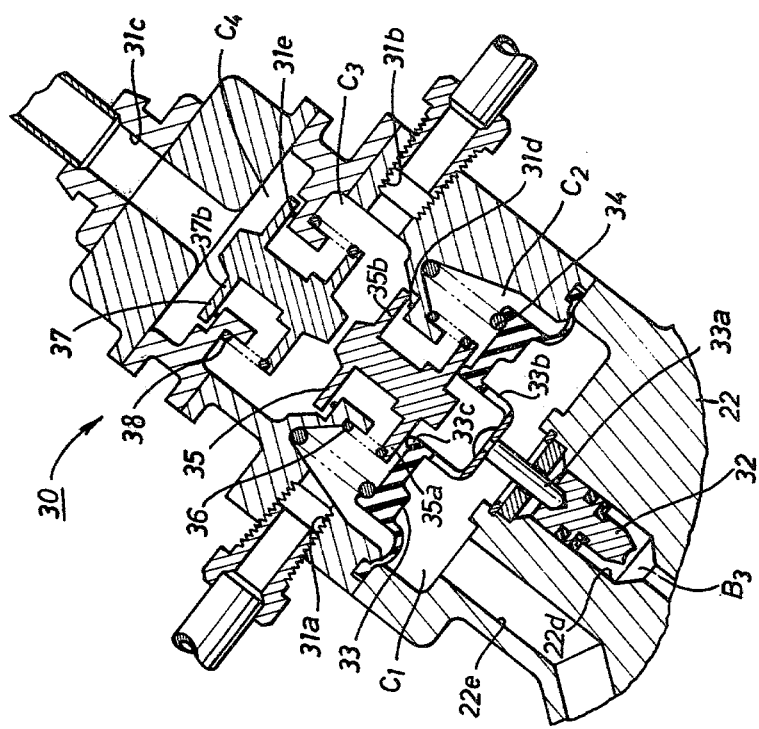

When the master cylinder 10 is actuated by depression of the brake pedal 11 to conduct normal braking operation of the vehicle, the master cylinder pressure is applied into the wheel brake cylinders 12 through the first fluid chamber $B_1$, the opened check valve 27 and the second fluid chamber $B_2$. At the same time, the master cylinder pressure is applied into the third fluid chamber $B_3$ from the first fluid chamber $B_1$. Then, the control piston 32 and the diaphragm piston assembly 33 are moved against biasing force of the spring 34 due to the master cylinder pressure in such a manner that the valve seat 33c of diaphragm piston assembly 33 is engaged with the lower disc 35a of valve body 35 to isolate the second chamber $C_2$ from the first chamber $C_1$, as shown in FIG. 3. When the valve body 35 is subsequently moved against biasing force of the spring 36 by engagement of the valve seat 33c with the lower disc 35a, the second chamber $C_2$ is communicated with the third chamber $C_3$ to apply the atmospheric pressure to the variable pressure chamber $A_2$ by way of the third and second chambers $C_3$ and $C_2$ and the connecting pipe 16. Consequently, the power piston assembly 23 is moved rightward against biasing force of the spring 24 due to difference in pressure between the pressure chambers $A_1$ and $A_2$, and subsequently the piston 25 in the cylinder body 22 is moved rightward by the push rod 23a of the diaphragm piston assembly 23 to close the check valve 27. After closure of the check valve 27, fluid pressure trapped in the second fluid chamber $B_2$ is increased by rightward movement of the piston 25 to actuate the wheel brake cylinders 12.

Figure 4:
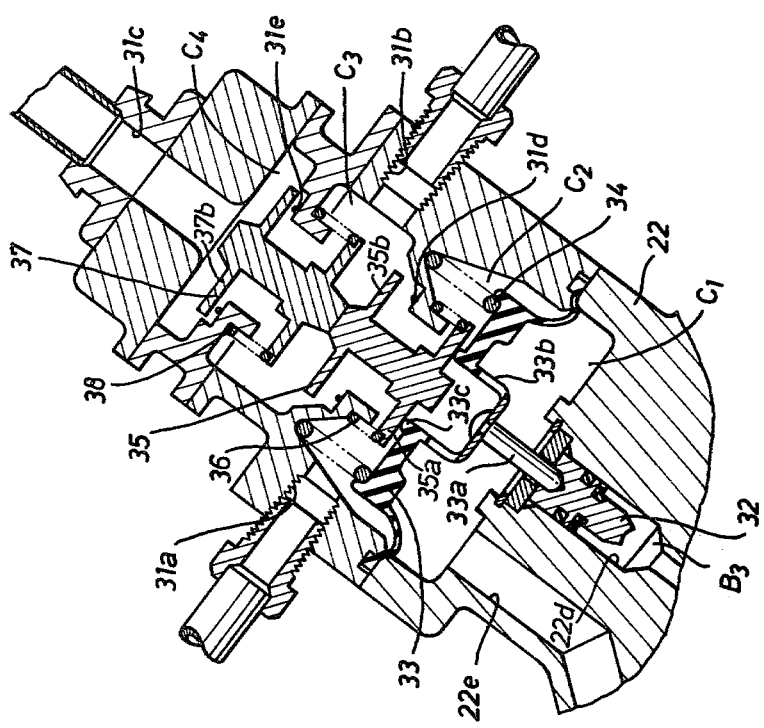

If the master cylinder 10 is actuated under a heavy loaded condition of the vehicle, the master cylinder pressure is further increased by depression of the brake pedal 11 so that the pressure in the third fluid chamber $B_3$ is increased to cause upward movement of the second valve body 37 by engagement with the first valve body 35. As a result, the fourth chamber $C_4$ is communicated with the second chamber $C_2$ through the third chamber $C_3$, as shown in FIG. 4, to apply the compressed gas into the variable pressure chamber $A_2$ from the accumulator 41. Thus, the diaphragm piston assembly 23 is powerfully moved rightward against biasing force of the spring 24 due to large pressure difference between the two chambers $A_1$ and $A_2$. This further increases the pressure in the second fluid chamber $B_2$ to ensure the braking operation.

In case of damages of the vacuum pump 14 or the vacuum tank 15 in the form of negative pressure supply, the negative pressure chamber $A_1$ and the first chamber $C_1$ are filled with the atmosphere. In this instance, when the fourth chamber $C_4$ is communicated with second chamber $C_2$ through the third chamber $C_3$ in response to upward movement of the second valve body 37, as described above, the compressed gas from the accumulator 41 is supplied into the variable pressure chamber $A_2$ to cause pressure difference between the two chambers $A_1$ and $A_2$. Thus, the diaphragm piston assembly 23 is moved rightward against biasing force of the spring 24 so that the pressure in the second fluid chamber $B_2$ increases to ensure the braking force of the vehicle.

Although the compressed gas is stored within the accumulator 41 from the exhaust pipe 43 by means of the exhaust braking device 40 in the embodiment described above, it will be recognized that an air compressor driven by the prime engine may be used to store the compressed air within the accumulator 41.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A brake booster for a wheeled vehicle having an engine including an exhaust braking system, a source of negative pressure, and a source of positive pressure, said brake booster acting in a hydraulic circuit connecting a master cylinder to wheel brake cylinders, comprising:

a housing provided at one side thereof with a cylinder body including a first bore for interposition within said hydraulic circuit and a second bore in communication with said first bore;

an operating piston being reciprocally disposed within said first bore for subdividing the interior of said first bore into first and second fluid chambers in fluid-flow communication with said master cylinder and said wheel brake cylinders, respectively, said operating piston including a check valve permitting fluid in said first fluid chamber to flow to said second fluid chamber when said operating piston is in a retracted position and preventing flow of fluid in said second fluid chamber to said first fluid chamber when said operating piston is translated from said retracted position;

a biased diaphragm piston reciprocally disposed within said housing and subdividing the interior of said housing into a negative pressure chamber and a variable pressure chamber, said negative pressure chamber being in fluid-flow communication with said source of negative pressure and said variable pressure chamber being selectively connected for fluid-flow communication with said negative pressure chamber, with said source of positive pressure and with atmospheric pressure, said diaphragm piston having a push rod extending into said first bore for translating said operating piston from said retracted position to increase hydraulic pressure of fluid trapped within said second fluid chamber on closing of said check valve;

a control piston movably disposed within said second bore of said cylinder body and being movably responsive to fluid pressure supplied by said master cylinder in to said second bore through said first fluid chamber of said first bore;

first control valve means cooperating with said control piston for connecting in fluid flow communication said variable pressure chamber to said negative pressure chamber under inoperative condition of said control piston and for connecting in fluid flow communication said variable pressure chamber with atmospheric pressure in response to movement of said control piston, said first control valve means comprising:

a biased diaphragm operatively connected to said control piston;

a first valve seat provided on said diaphragm for controlling fluid flow communication between said negative pressure chamber and said variable pressure chamber;

a second valve seat for controlling fluid flow communication between said variable pressure chamber and atmospheric pressure; and a first biased valve body including a pair of valve parts engagable with said first and second valve seats in response to movement of said diaphragm to selectively connect in fluid flow communication said variable pressure chamber, with said negative pressure chamber, and with atmospheric pressure; and second control valve means cooperating with said first control valve means for selectively connecting in fluid flow communication said variable pressure chamber with said source of positive pressure in response to displacement of said first control valve means, said second control valve means comprising:

a third valve seat for controlling fluid flow communication between said variable pressure chamber and said source of positive pressure; and a second biased valve body including a valve part engagable with said third valve seat to sequentially connect in fluid-flow communication said variable pressure chamber with said source of positive pressure in response to operation of said first valve body.

2. The brake booster of claim 1 wherein said source of positive pressure is an accumulator tank in fluid-flow communication with the exhaust of said engine adapted to be charged with exhaust gases upon actuation of said exhaust braking system.

* * * * *